US012782698B2

(12) United States Patent
Hsieh et al.

(10) Patent No.: US 12,782,698 B2
(45) Date of Patent: Nov. 3, 2026

(54) SCANNING DEVICE AND iSCAT CONFOCAL MICROSCOPE SYSTEM

(71) Applicant: ACADEMIA SINICA, Taipei (TW)

(72) Inventors: Chia-Lung Hsieh, Taipei City (TW); Yi-Teng Hsiao, Taipei City (TW)

(73) Assignee: ACADEMIA SINICA, Taipei (TW)

(*) Notice: Subject to any disclaimer, the term of this patent is extended or adjusted under 35 U.S.C. 154(b) by 379 days.

(21) Appl. No.: 18/521,652

(22) Filed: Nov. 28, 2023

(65) Prior Publication Data

US 2025/0172792 A1 May 29, 2025

(51) Int. Cl.
*G02B 21/00* (2006.01)

(52) U.S. Cl.
CPC ..... *G02B 21/0032* (2013.01); *G02B 21/0044* (2013.01); *G02B 21/0056* (2013.01); *G02B 21/008* (2013.01)

(58) Field of Classification Search
CPC ............ G02B 21/0032; G02B 21/0044; G02B 21/0056; G02B 21/008; G02B 21/0068; G02B 21/0092; G02B 21/14
See application file for complete search history.

(56) References Cited

U.S. PATENT DOCUMENTS 6,248,995 B1* 6/2001 Tanaami .................. G01B 9/04 359/368
9,812,846 B2 11/2017 Yun et al.
2004/0150880 A1* 8/2004 Nakata ............... G02B 21/0076 359/371
2006/0158721 A1* 7/2006 Nakata .................. G02B 21/16 359/371

(Continued)

FOREIGN PATENT DOCUMENTS

CN 109477955 A 3/2019
TW 579435 B 3/2004

(Continued)

OTHER PUBLICATIONS

Hsiao et al., "Spinning disk interferometric scattering confocal microscopy captures millisecond timescale dynamics of living cells," Optics Express, vol. 30, No. 25, Nov. 29, 2022, 13 pages.

(Continued)

*Primary Examiner* — Mustak Choudhury
(74) *Attorney, Agent, or Firm* — MUNCY, GEISSLER, OLDS & LOWE, P.C.

(57) ABSTRACT

The disclosure provides a scanning device for iSCAT confocal microscope observation is disclosed comprising: a lens for receiving an incident light; a spinning disk having pinholes; and a polarization beam splitter between the lens and the spinning disk. The lens, the polarization beam splitter and the spinning disk are configured to cause the incident light to be through the lens, the polarization beam splitter and the spinning disk for sample illumination. The spinning disk and the polarization beam splitter are configured to cause a return iSCAT signal to be through the spinning disk to the polarization beam splitter. The pinholes are configured to spatially filter the return iSCAT signal for confocal-based detection. The polarization beam splitter is configured to direct the return iSCAT signal to a light path for image observation.

20 Claims, 9 Drawing Sheets

(56) References Cited

U.S. PATENT DOCUMENTS

2016/0178880 A1* 6/2016 Yamazaki .......... G02B 21/0048
359/201.2

FOREIGN PATENT DOCUMENTS

TW I534473 B 5/2016
WO WO2018011591 A1 1/2018

OTHER PUBLICATIONS

A TW Office Action and search report for Application No. TW112146106 cited by TIPO on Jan. 10, 2025 and it's English translation is attached (16 pages).

* cited by examiner

SCANNING DEVICE AND iSCAT CONFOCAL MICROSCOPE SYSTEM

FIELD OF INVENTION

The present description relates to a scanning device and an iSCAT (interferometric scattering) confocal microscope system.

BACKGROUND

Interferometric scattering (iSCAT) microscopy is a sensitive imaging method that measures the linear scattering light of a sample through interference. The iSCAT microscopy uses common-path interferometry to detect the linear scattering fields associated with samples. However, the iSCAT microscopy typically employs wide-field imaging in which the axial resolution is poor. When the iSCAT microscopy measures a complex sample, such as a biological cell, the superposition of the scattering signals from various sources, particularly those along the optical axis of the microscope objective, considerably complicates the data interpretation.

SUMMARY

The disclosure provides a scanning device for iSCAT confocal microscope observation is disclosed comprising: a lens for receiving an incident light; a spinning disk having pinholes; and a polarization beam splitter between the lens and the spinning disk. The lens, the polarization beam splitter and the spinning disk are configured to cause the incident light to be through the lens, the polarization beam splitter and the spinning disk for sample illumination. The spinning disk and the polarization beam splitter are configured to cause a return iSCAT signal to be through the spinning disk to the polarization beam splitter. The pinholes are configured to spatially filter the return iSCAT signal for confocal-based detection. The polarization beam splitter is configured to direct the return iSCAT signal to a light path for image observation.

In some embodiments, the polarization beam splitter is configured to reflect the return iSCAT signal to the light path for the image observation, and the return iSCAT signal is adapted to form an iSCAT confocal image on an image capturing device. In some embodiments, the incident light is linearly polarized light before reaching the polarization beam splitter, a quarter-wave plate is configured to transform the incident light from linearly polarized light into circularly polarized light and to transform the return iSCAT signal from circularly polarized light into linearly polarized light, and the polarization beam splitter has a high transmission for the linear polarization of the incident light and a high reflection for the linear polarization of return iSCAT signal. In some embodiments, the incident light is p-polarized light before reaching the polarization beam splitter, a quarter-wave plate is configured to transform the incident light from p-polarized light into circularly polarized light and to transform the return iSCAT signal from circularly polarized light into s-polarized light, and the polarization beam splitter has a high transmission for p-polarized light and a high reflection for s-polarized light. In some embodiments, the quarter-wave plate is inserted in a filter cube turret of a microscope. In some embodiments, the scanning device further comprises a linear polarizer in the light path for the image observation. In some embodiments, the incident light is laser light, the spinning disk is a Nipkow disk and rotatable, and the pinholes are configured to be illuminated by the incident light to optically project to a sample through a microscope.

The disclosure provides an iSCAT confocal microscope system comprising: a microscope and a scanning device. The scanning device comprises: a lens for receiving an incident light; a spinning disk having pinholes; and a polarization beam splitter between the lens and the spinning disk. The polarization beam splitter, the spinning disk and the microscope are configured to cause the incident light to be through the lens, the polarization beam splitter, the spinning disk and the microscope. The microscope, the spinning disk and the polarization beam splitter are configured to cause a return iSCAT signal to be through the microscope and the spinning disk to the polarization beam splitter. The pinholes are configured to spatially filter the return iSCAT signal for confocal-based detection. The polarization beam splitter is configured to direct the return iSCAT signal to a light path for image observation.

In some embodiments, the polarization beam splitter is configured to reflect the return iSCAT signal to the light path for the image observation, and the return iSCAT signal is adapted to form an iSCAT confocal image on an image capturing device. In some embodiments, the incident light is linearly polarized light before reaching the polarization beam splitter, a quarter-wave plate is configured to transform the incident light from linearly polarized light into circularly polarized light and to transform the return iSCAT signal from circularly polarized light into linearly polarized light, and the polarization beam splitter has a high transmission for the linear polarization of the incident light and a high reflection for the linear polarization of return iSCAT signal. In some embodiments, the incident light is p-polarized light before reaching the polarization beam splitter, a quarter-wave plate is configured to transform the incident light from p-polarized light into circularly polarized light and to transform the return iSCAT signal from circularly polarized light into s-polarized light, and the polarization beam splitter has a high transmission for p-polarized light and a high reflection for s-polarized light. In some embodiments, the quarter-wave plate is in a filter cube turret of the microscope. In some embodiments, the scanning device further comprises a linear polarizer in the light path for image observation. In some embodiments, the incident light is laser light, the spinning disk is a Nipkow disk and rotatable, and the pinholes are configured to be illuminated by the incident light to optically project to a sample through the microscope. In some embodiments, the microscope is an inverted optical microscope or a transmission confocal microscopy.

The disclosure provides a method for iSCAT confocal microscope observation comprising: receiving an laser incident light by a lens, wherein the laser incident light is linearly polarized light; illuminating pinholes of a spinning disk by the laser incident light to optically project to a sample through an optical microscope; transforming the laser incident light from linearly polarized light into circularly polarized light before the laser incident light reaches the sample; transforming a return iSCAT signal from circularly polarized light into linearly polarized light; spatially filtering the return iSCAT signal for confocal-based detection by the pinholes; and directing the return iSCAT signal to a light path for image observation.

In some embodiments, the spinning disk is a Nipkow disk and rotatable, the return iSCAT signal is linearly polarized in the light path for the image observation, and the return iSCAT signal is adapted to form an iSCAT confocal image. In some embodiments, the method further comprises: removing background in the iSCAT confocal image based on the spatial heterogeneity of background. In some embodiments, the microscope is an inverted optical microscope or a transmission confocal microscopy. In some embodiments, the return iSCAT signal is directed to the light path for image observation by a polarization beam splitter. In some embodiments, the laser incident light is p-polarized light. In some embodiments, the laser incident light and the return iSCAT signal have different linear polarizations.

BRIEF DESCRIPTION OF DRAWINGS

In order to sufficiently understand the essence, advantages and the preferred embodiments of the present invention, the following detailed description will be more clearly understood by referring to the accompanying drawings.

DETAILED DESCRIPTION

Figure 1:
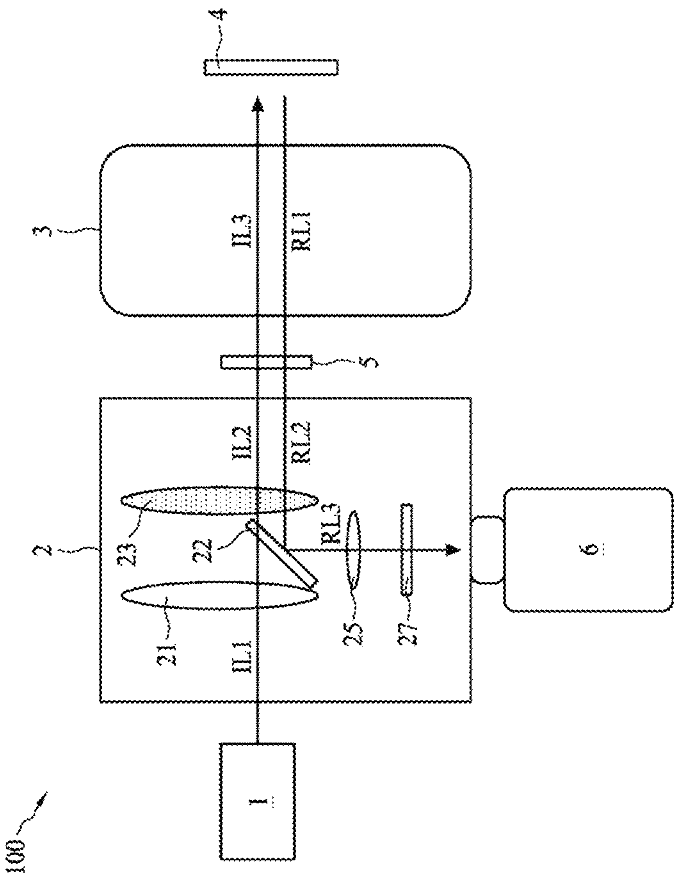
FIG. 1 depicts a schematic diagram showing an iSCAT confocal microscopy system according to some embodiments.

The following description shows the preferred embodiments of the present invention. The present invention is described below by referring to the embodiments and the figures. Thus, the present invention is not intended to be limited to the embodiments shown, but is to be accorded the principles disclosed herein. Furthermore, that various modifications or changes in light thereof will be suggested to persons skilled in the art and are to be included within the spirit and purview of this application and scope of the appended claims.

The disclosures of "spinning disk interferometric scattering confocal microscopy captures millisecond timescale dynamics of living cells", published 29 Nov. 2022, Vol. 30, No. 25/5 Dec. 2022, Optics Express 45233, and it supplemental document are incorporated herein by reference in its entirety.

Label-free optical interference microscopy is a tool for biological studies. Cell biologists rely on phase contrast and differential interference contrast (DIC) microscopes to monitor native cell morphology. Long-term, noninvasive live cell imaging enables the investigation of complex cell dynamics over broad spatial and temporal scales, where photobleaching and phototoxicity limit fluorescence approaches.

Cell imaging requires high resolutions in all three dimensions owing to the essentially three-dimensional (3D) nature of biological cell structures. Despite the interference microscopy is used in label-free cell imaging, nanoscopic cell dynamics remain a challenge for the majority of existing technologies owing to weak signals.

To capture the nanoscopic cell dynamics, there are several requirements for visualization. First is the detection sensitivity. Small biological entities scatter less light; therefore, a sensitive microscope is required for their detection. The photon shot noise determines the weakest signal that can be detected above the photon shot noise, which determines the sensitivity of interference microscopy. Thus, the microscope is able to accommodate sufficient illumination intensity without saturating the detector. Low-coherence light sources (LEDs and incandescent lamps that are commonly used in QPI) have trouble delivering a high radiance to the sample, which ultimately limits the detection sensitivity. Second, the dynamic nature of the cell complicates the achievable detection sensitivity in live cell imaging applications. Driven by thermal fluctuation and cell activities, small biological entities (e.g., vesicles and filaments below 100 nm) move continuously in 3D space. The microscope has a fast enough data acquisition rate to reduce the blurring caused by rapidly moving objects. Therefore, interference microscope techniques that require multiple frames for reconstruction, and face challenges in capturing the rapid dynamics of nanosized objects. The need for rapid image acquisition also precludes the use of extensive frame averaging, a common method to virtually improve the signal-to-noise ratio (SNR). The third requirement for visualizing the nanoscopic cell dynamics is the scattering background, including the nonspecific scattering background created by the optical components and the out-of-focus signal of the specimen. In principle, one can effectively remove the scattering background by postprocessing the image if the background can be accurately measured or estimated. Meanwhile, the out-of-focus scattering background of the sample is eliminated through optical sectioning (e.g., confocal-based detection).

The common-path wide-field interferometric scattering (iSCAT) microscopy can be used. The iSCAT microscopy detects the backscattered light of the sample through interference where the reflection of the supporting coverglass serves as the reference beam. Using laser illumination, light is efficiently delivered across the field of view (FOV). With a high-speed camera, the interference image is captured at a high frame rate. The iSCAT microscopy resembles reflection interference contrast microscopy (RICM) that was originally demonstrated with low-coherence light. It is possible for the iSCAT microscopy to capture the nanoscopic motion of small nanoparticles with microsecond temporal resolution. With proper signal integration and background correction, iSCAT microscopy enables the direct visualization of single unlabeled biological macromolecules on a clean coverglass.

The wide-field iSCAT microscopy has good sensitivity and speed, allowing for resolving the dynamics of plasma membrane and intracellular vesicles. However, the wide-field iSCAT still need further optimization for label-free cell imaging. The cell has a complex 3D structure that produces a great amount of out-of-focus background. Notably, iSCAT detects cell membrane reflection well, producing interference fringes that make intracellular organization difficult to visualize. The iSCAT confocal microscope is essentially a reflectance confocal microscope with a pinhole mask defining the detection volume. When using a reflectance confocal microscope to acquire images of cells close to a coverglass (within 1-2 μm), the reflection of the coverglass serves as a reference field that interferes with the backscattered signal of the cells. Interferometric detection enhances the signal contrast, enabling the detection of weakly scattering objects. In addition, the out-of-focus cell background was considerably reduced, and the nanoscopic cell dynamics can be visualized with in exquisite detail. However, the method of point scanning inherently limits the speed of image acquisition. With a typical pixel dwell time of 1 μs, it will take hundreds of milliseconds to capture a high-resolution image (e.g., 512×512 resolution at a frame rate of a few hertz).

In some embodiments, an iSCAT confocal microscopy system is provided to employ a high-speed, wide-field iSCAT microscopy in conjunction with confocal optical sectioning. Utilizing the multibeam scanning strategy of spinning disk confocal microscopy, the iSCAT confocal microscope system can acquire images at a rate of more than 100, e.g. about 1,000 frames per second (fps). The iSCAT confocal microscope system is highly sensitive, for example, individual 10 nm gold nanoparticles can be successfully detected. Using high-speed iSCAT confocal imaging, the rapid movements of single nanoparticles on the model membrane and single native vesicles in the living cells can be captured. The iSCAT confocal microscopy system can be applied to Label-free iSCAT confocal imaging which enables the detailed visualization of nanoscopic cell dynamics in their most native forms.

In some embodiments, the iSCAT confocal microscope system can be high-speed and capture hundreds of frames per second (fps), i.e., approximately two orders of magnitude faster than its point scanning counterpart. With a reduced FOV, an image acquisition rate of 1,000 fps can be achieved. The iSCAT confocal microscope system may be rebuild from a spinning disk confocal fluorescence microscope. Polarization optics are implemented to enhance the signal collection efficiency and reduce the ambient background noise. The detection sensitivity and speed of the iSCAT confocal microscope system can be evaluated by using nanoparticle samples. For example, very small single gold nanoparticles (AuNPs), as small as 10 nm in diameter, can be successfully detected. Moreover, in the iSCAT confocal microscopy system with high-speed 3D cell imaging, the nanoscopic diffusion of native vesicles can be resolved.

FIG. 1 depicts a schematic diagram showing an iSCAT confocal microscopy system 100 according to some embodiments. In FIG. 1, the iSCAT confocal microscopy system 100 comprises a microscope 3 and a scanning device 2. The scanning device 2 comprises: a lens 21 for receiving an incident light IL1; a spinning disk 23 having pinholes; and a polarization beam splitter 22 between the lens 21 and the spinning disk 23. The polarization beam splitter 22, the spinning disk 23 and the microscope 3 can polarize, guide and direct light so that the incident light IL1 is adapted to be through the lens 21, the polarization beam splitter 22, the spinning disk 23 and the microscope 3 to illuminate a sample 4. A return iSCAT signal RL1 is generated from the sample 4 after the incident light reaches the sample 4. The microscope 3, the spinning disk 23 and the polarization beam splitter 22 let the return iSCAT signal RL1 be through the microscope 3 and the spinning disk 23 and reach the polarization beam splitter 22. The pinholes spatially filters the return iSCAT signal RL2 for confocal-based detection. The return iSCAT signal RL2 is directed to a light path for image observation (where the return iSCAT signal RL3 goes). For example, the polarization beam splitter 22 directs the return iSCAT signal RL2 to the light path for image observation. The image observation may be implemented by an image capturing device 6, which may be a camera. The camera may be a high-speed camera, and can capture static images, dynamic images or videos.

In some embodiments, the incident light IL1 can be laser light provided by a light source 1. The light source 1 may be a laser diode module with a specific wavelength, for example 561 nm wavelength. The lens 21 may include a plurality of microlenses or a microlens array. The spinning disk 23 may be a Nipkow disk and rotatable. The pinholes may be formed with a pinhole array and are illuminated by the incident light IL1 to optically project light to the sample 4 through the microscope 3. The microscope 3 may be an inverted optical microscope or a transmission confocal microscopy. Further, a quarter-wave plate 5 can transform the incident light IL2 from linearly polarized light into circularly polarized light, and transform the return iSCAT signal RL1 from circularly polarized light into linearly polarized light (return iSCAT signal RL2). For example, the quarter-wave plate 5 can transform the incident light IL2 from p-polarized light into circularly polarized light, and transform the return iSCAT signal RL1 from circularly polarized light into s-polarized light (return iSCAT signal RL2). In some embodiments, the quarter-wave plate 5 can be installed in the scanning device 2 or in the microscope 3 or between the scanning device 2 and the microscope 3.

In some embodiments, the polarization beam splitter 22 reflects the return iSCAT signal RL2 to the light path (where the return iSCAT signal RL3 goes) for image observation, and the return iSCAT signal RL3 is adapted to result in an iSCAT confocal image on the image capturing device 6. The polarization beam splitter 22 has a high transmission for the linear polarization of the incident light IL1 and a high reflection for the linear polarization of return iSCAT signal RL2. The incident light IL1 is linearly polarized before reaching the polarization beam splitter 22. The polarization beam splitter 22 may be made via sputter coating on a fused silica substrate. For example, the incident light IL1 may be p-polarized light before reaching the polarization beam splitter 22, and the polarization beam splitter 22 has a high transmission for p-polarized light and a high reflection for s-polarized light. Alternatively, the incident light IL1 may be s-polarized light before reaching the polarization beam splitter 22, and the light path or optical devices may be modified accordingly. In some embodiments, polarization beam splitter 22 may have an extinction ratio of Tp:Ts>250:1 and/or Rs:Rp>10:1 at an incidence angle of 45° for example at the wavelength of 561 nm or at other wavelength. In some embodiments, polarization beam splitter 22 may have an extinction ratio of Tp:Ts>500:1 and/or Rs:Rp>20:1 at an incidence angle of 45° for example at the wavelength of 561 nm or at other wavelength. In some embodiments, polarization beam splitter 22 may have an extinction ratio of Tp:Ts>1000:1 and/or Rs:Rp>40:1 at an incidence angle of 45° for example at the wavelength of 561 nm or at other wavelength. Tp:Ts refers to the ratio of transmitted p-polarized light to s-polarized light. Rs:Rp refers to the ratio of reflected s-polarized light to p-polarized light. The polarization beam splitter 22 may be made via sputter coating on a substrate, for example a fused silica substrate.

In some embodiments, the incident light IL1 is received by the lens 21. The incident light IL1 is linearly polarized laser light, for example p-polarized light. Then the incident light IL1 is through the polarization beam splitter 22 and pinholes of the spinning disk 23 as the incident light IL2.

The incident light IL2 is transformed from linearly polarized light into circularly polarized light as the incident light IL3 before the incident light IL3 reaches the sample 4. The pinholes are illuminated by the incident light IL2/IL3 to optically project light to the sample 4. After the incident light IL3 reaches the sample 4, a return iSCAT signal RL1 is generated from the sample 4. The return iSCAT signal RL1 is transformed from circularly polarized light into linearly polarized light as the return iSCAT signal RL2. The incident light IL1 and the return iSCAT signal RL2 have different linear polarizations from each other. For example, when the incident light IL1 is p-polarized light, then the return iSCAT signal RL2 is s-polarized light, the incident light IL2 is transformed from p-polarized light into circularly polarized light as the incident light IL3 and the return iSCAT signal RL1 is transformed from circularly polarized light into s-polarized light as the return iSCAT signal RL2. The return iSCAT signal RL2 is spatially filtered for confocal-based detection by the pinholes, and then the return iSCAT signal RL2 is reflected to the light path for image observation by the polarization beam splitter 22 as the return iSCAT signal RL3. Then, the return iSCAT signal RL3 is adapted to result in an iSCAT confocal image on the image capturing device 6. An iSCAT confocal image can be generated by the image capturing device 6. The iSCAT confocal image may be a static image, a dynamic image or a part of a video. The combination of the polarization beam splitter 22 and the quarter-wave plate 5 can enhance the collection efficiency of the return iSCAT signal of the sample 4.

In some embodiments, the scanning device 2 further comprises a lens 25 and a linear polarizer 27 in the light path for image observation. The linear polarizer 27 is installed in front of the image capturing device 6 to eliminate the nonspecific reflection background of the apparatus (mainly contributed by the reflection of the spinning disk with pinholes). A very weak reflective background of the spinning disk with pinholes remains, which is thought to be created by the depolarization effects of the backscattering of the pinholes. The scanning device 2 or the microscope 3 can include other elements for example, lenses or turrets which are not shown in FIG. 1.

Figure 2A:
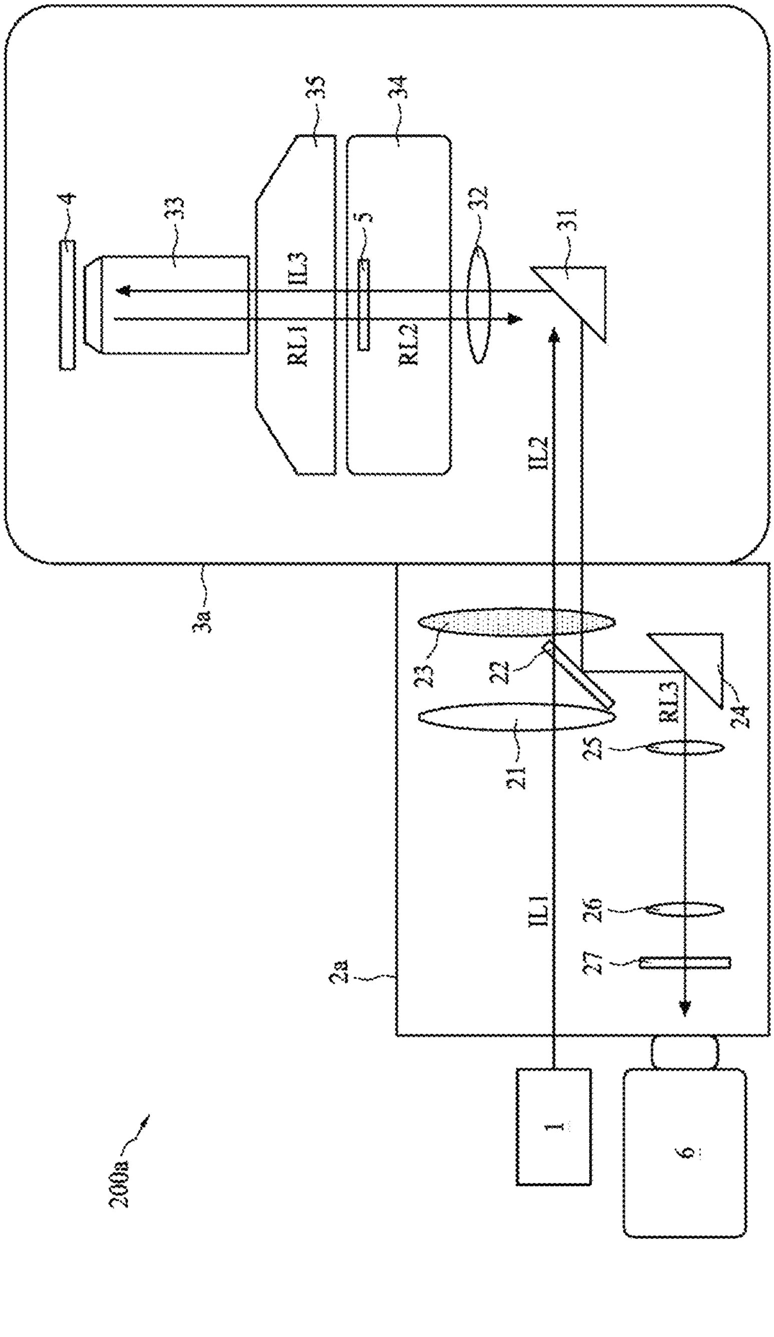
FIG. 2*a* depicts a schematic diagram showing an iSCAT confocal microscopy system according to some embodiments.

FIG. 2*a* depicts a schematic diagram showing an iSCAT confocal microscopy system 200*a* according to some embodiments. In FIG. 2*a*, the microscope 3*a* of the iSCAT confocal microscopy system 200*a* includes a mirror 31, a tube lens 32, a microscope objective 33, filter cube turret 34 and an objective turret 35. The quarter-wave plate 5 may be installed in the filter cube turret 34. The iSCAT confocal microscopy system 200*a* and the microscope 3*a* operate in reflection. Moreover, the scanning device 2*a* may include a mirror 24 and a lens 26 further arranged in the light path for image observation. The scanning device 2*a* or the microscope 3*a* can include other elements for example, lenses or turrets which are not shown in FIG. 2*a*.

Figure 2B:
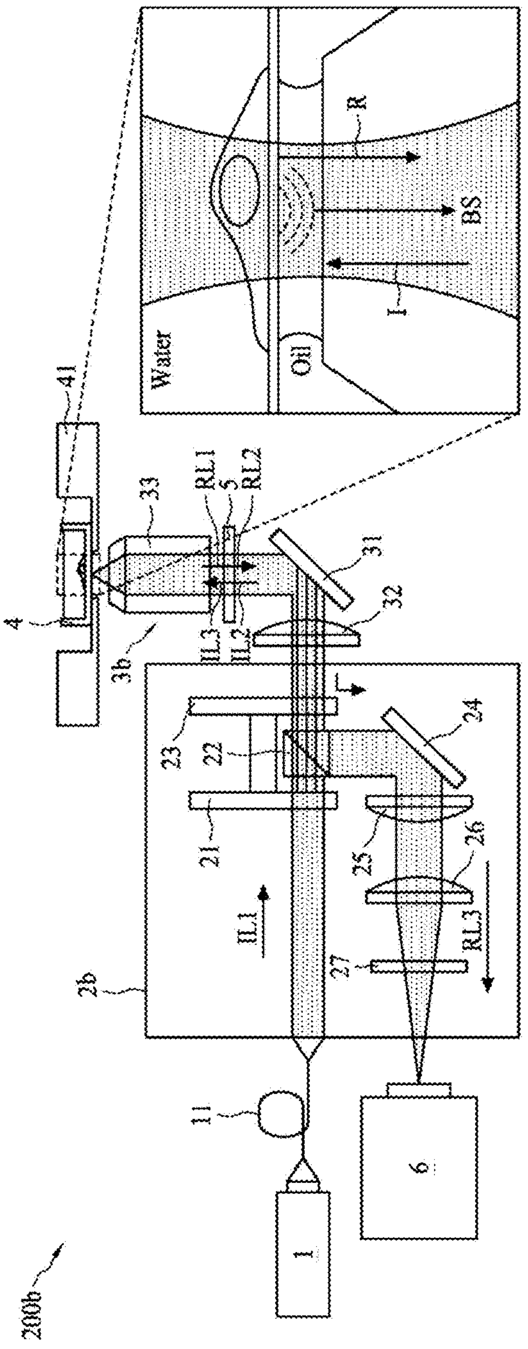
FIG. 2*b* depicts schematic diagrams showing an iSCAT confocal microscopy system according to some embodiments.

FIG. 2*b* depicts a schematic diagram showing an iSCAT confocal microscopy system 200*b* according to some embodiments. In FIG. 2*b*, a polarization maintaining fiber 11 is connected between the light source 1 and the scanning device 2*b*, so the incident light IL1 is from the light source 1 to the lens 21. The sample 4 is on a sample stage 41. FIG. 2*b* also depicts the iSCAT detection of the backward scattering of a cell that interferes with the reference field reflected from the water-coverglass interface. The iSCAT confocal microscopy system 200*b* and the microscope 3*b* operate in reflection. The scanning device 2*b* or the microscope 3*b* can include other elements for example, lenses or turrets which are not shown in FIG. 2*b*.

Figure 3:
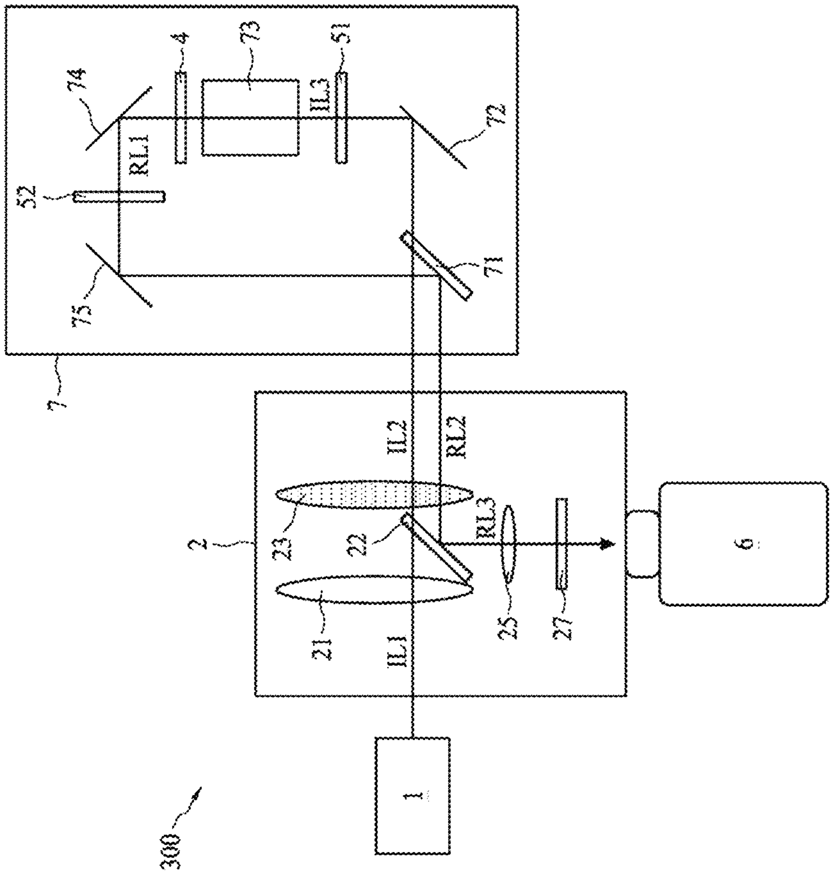
FIG. 3 depicts schematic diagrams showing an iSCAT confocal microscopy system according to some embodiments.

FIG. 3 depicts a chematic diagram showing an iSCAT confocal microscopy system 300 according to some embodiments. In FIG. 3, the iSCAT confocal microscopy system 300 and a microscope 7 operate in transmission. The incident light path to the sample and the return iSCAT signal path from the sample are different, but they have same path between the microscope 7 and the scanning device 2. The microscope 7 includes a polarization beam splitter 71, a mirror 72, a microscope objective 73, a mirror 74, a mirror 75. A quarter-wave plate 51 is installed in the incident light path to the sample, for example, between the mirror 72 and the microscope objective 73. The quarter-wave plate 51 transforms the incident light IL2 from linearly polarized (p-polarized) light into circularly polarized light as the incident light IL3. The incident light is directed by the optical elements to illuminate the sample 4. A quarter-wave plate 52 is installed in the return iSCAT signal path from the sample, for example, between the mirror 74 and the mirror 75. The quarter-wave plate 52 transforms the return iSCAT signal RL1 from circularly polarized light into linearly polarized (s-polarized) light as the return iSCAT signal RL2. The return iSCAT signal is directed by the optical elements to return. The scanning device 2 or the microscope 7 can include other elements for example, lenses or turrets which are not shown in FIG. 3.

In other embodiments, the quarter-wave plates 51, 52 may be installed in the incident light path to the sample. For example, the quarter-wave plate 51 transforms the incident light IL2 from linearly polarized (p-polarized) light into circularly polarized light, and then the quarter-wave plate 52 transforms the incident light from circularly polarized light into linearly polarized (s-polarized) light. The linearly polarized (s-polarized) incident light is directed by the optical elements to illuminate the sample 4. The return iSCAT signal is not processed by the transformation of polarization. In other embodiments, the quarter-wave plates 51, 52 may be installed in the return iSCAT signal path from the sample. For example, the linearly polarized (p-polarized) incident light is directed by the optical elements to illuminate the sample 4. The quarter-wave plate 51 transforms the return iSCAT signal RL1 from linearly polarized (p-polarized) light into circularly polarized light, and then the quarter-wave plate 52 transforms the return iSCAT signal RL1 from circularly polarized light into linearly polarized (s-polarized) light.

Transmission geometry would offer several advantages. In transmission, the nonscattered transmitted beam readily serves as a robust reference beam on the common path. Therefore, the imaging depth would not be restricted as in the case of reflection. In addition, unlike the reflection geometry that detects much of the membrane reflection, transmission imaging is more effective at detecting the intracellular signals. Wide-field iSCAT microscopy in transmission, referred to as coherent brightfield (COBRI) microscopy, has been demonstrated to resolve intracellular nanoscopic cell dynamics, including vesicle transportation, chromatin remodeling, and virus-membrane interactions. Transmission confocal microscopy is a less developed technology compared to its reflection counterpart because of the difficulty of descanning the transmitted beam with the synchronization of the incident beam. The descanning of the transmitted beam can be achieved by sending it back to the original optical paths or, in theory, adding a synchronized descanning unit in transmission can descan the transmitted beam.

In the above embodiments, polarization optics are used to enhance signal collection efficiency and to suppress nonspecific scattering background. Residual background can be further eliminated by image data processing, enabling a high detection sensitivity. The iSCAT confocal microscopy system with spinning disk allows for fast and sensitive scattering-based imaging of nano-sized objects with optical sectioning, which has broad applications in inspecting the organization and dynamics of biological cells. Thus, the image quality and detection sensitivity are improved by polarization optics. Nonspecific background can be removed by image data processing.

The iSCAT confocal microscopy system with spinning disk can be applied to visualize small biological nanoparticles, cell organelles and their dynamics without any exogenous labels. The iSCAT confocal microscope system can be easily integrated into a fluorescence spinning disk confocal microscope, providing iSCAT and fluorescence confocal images of the sample. Further, the iSCAT confocal microscope system can be high-speed and sensitive and can be constructed based on commercial parts with minimal optical alignment.

The iSCAT confocal microscope with spinning disk can be utilized with high-speed iSCAT confocal imaging technique to detect the backscattered light of nano-objects. In comparison with reflectance confocal microscope (RCM) which is optimized for deep tissue imaging with a subcellular spatial resolution by using near-infrared laser light, the iSCAT confocal measures the interference signal, and RCM imaging generally lacks a well-defined reference field for interferometric detection. Thus, the RCM measures the backscattering intensity, and its image is dark-field-like (i.e., the object that backscattered light appears bright in the image with an overall dark background). Using a high-NA objective and a visible laser light for illumination, RCM generates dark-field-like backscattering cell images. The achievable detection sensitivity of dark-field detection is typically lower than the interferometric detection because it is highly sensitive to the nonspecific background and readout noise.

The iSCAT confocal microscope system can operate close to the coverglass interface whose reflection serves as the reference field for interferometric detection. As the coverglass reflection disappears when the interface is no longer in focus, the imaging depth for iSCAT detection is effectively limited to a few micrometers. This imaging depth is generally sufficient for analyzing thin adherent cells. Within this detection volume, the iSCAT detection considerably improves imaging sensitivity and reveals weakly scattered signals from nano-objects. In a recent demonstration of the laser scanning iSCAT confocal microscope, several cell organelles and nanoscopic cell structures can be successfully resolved, including the endoplasmic reticulum and microtubules. Because of the confocal pinhole, the iSCAT confocal microscope system with spinning disk could also resolve these cell organelles or even mitochondria and lipid droplets that have been clearly visualized by other phase-sensitive interference phase microscopy. The challenges of label-free visualization of cell organelles are often due to the lack of signal-to-background ratio (SBR), instead of the lack of detection sensitivity. This is because all cell structures scatter light and it becomes difficult to distinguish them solely based on the iSCAT image when they are densely packed. It is relatively easy to resolve different cell organelles at the cell periphery where the cell structures are mostly 2D and spatially separated.

Using spinning disk confocal microscopy and a high-speed camera, the iSCAT confocal imaging achieves a rate of 1,000 fps. An improved frame rate can be achieved with a faster rotating spinning disk and a faster camera. The iSCAT confocal microscope system with spinning disk has a potential advantage of achieving a large FOV at a high speed. For example, in the operation of a Yokogawa spinning disk confocal microscope, around 1,000 laser foci are scanned across sample at a maximal speed of about 1,000 Hz. In comparison, the wide-field iSCAT microscopes typically illuminate the sample by scanning a single beam with a pair of acousto-optic deflectors (AODs) at a maximal scanning speed of about 100 kHz. Thus, it appears that the multi-beam scanning of the spinning disk confocal could cover a larger FOV within a shorter frame time. To increase the imaging depth of a thick 3D sample, it would generate a steady reference beam, possibly with Michelson and Mirau objectives. With a steady reference field, the axial range of iSCAT confocal imaging would be determined by the working distance of the objective.

Figure 4A:
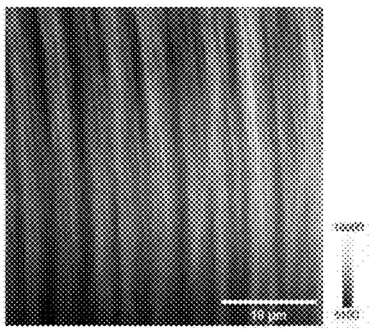
FIGS. 4*a*-4*d* show iSCAT confocal images of 30 nm gold nanoparticles deposited on a glass substrate.
Figure 4B:
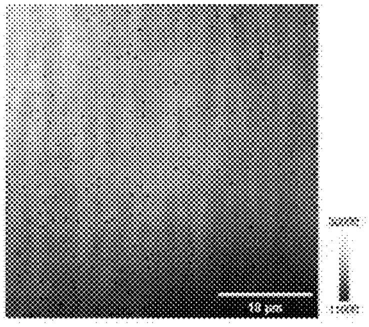
Figure 4C:
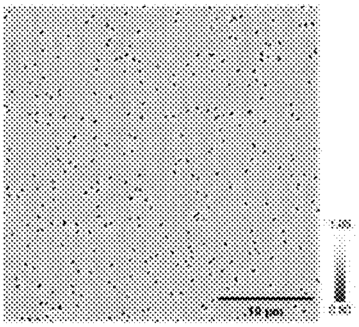
Figure 4D:
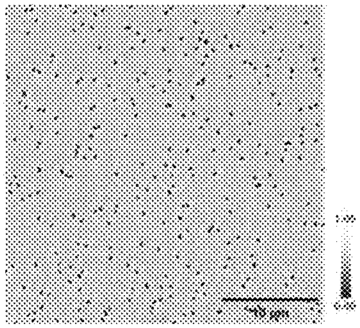
Figure 4E:
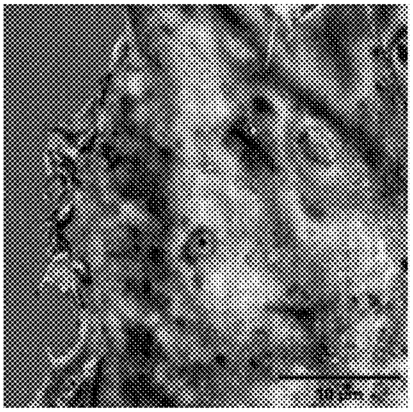
FIGS. 4*e*-4*i* show the background removal of iSCAT confocal images.
Figure 4F:
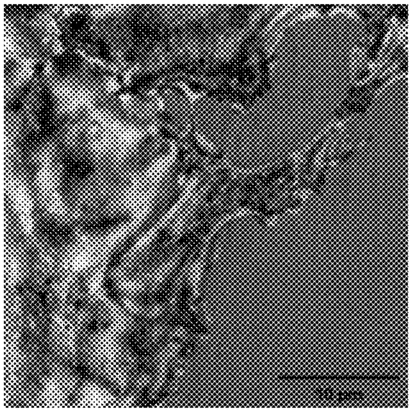

FIGS. 4*a*-4*d* show iSCAT confocal images of 30 nm gold nanoparticles deposited on a glass substrate. FIG. 4*a* displays the raw image without installation of a linear polarizer nor a quarter-wave plate. No particles can be observed due to the presence of a strong heterogeneous background. FIG. 4*b* shows the iSCAT confocal image of the particle sample after installing a quarter waveplate, in which individual nanoparticles emerge as small dark spots. FIG. 4*c* shows the image after the heterogeneous background or illumination background is digitally removed through image processing, where individual particles are clearly observed. FIG. 4*d* plots the optimized image of the sample after installing a linear polarizer, where the signal-to-noise ratio is slightly improved.

Figure 4G:
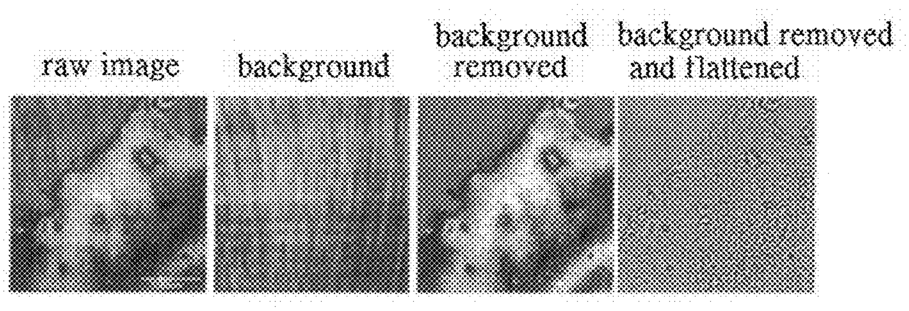

FIGS. 4*c*-4*i* show the background removal of iSCAT confocal images. FIGS. 4*c*-4*f* show the iSCAT confocal images after background removal. In some embodiments, background removal by image data postprocessing improves the image quality for visualization of small cell structures. The raw spinning disk iSCAT confocal images exhibit spatially nonuniform intensity variations stemming from undesired reflections and interference in the spinning disk scanning unit. These variations, referred to as "background", hinder direct visualization of weak scattering signals emitted by small objects. While the background is spatially heterogeneous, it remains temporally stable. Consequently, it can be measured beforehand and digitally eliminated through image postprocessing. To accomplish this, a blank sample consisting of clean coverglass is imaged to obtain the background reference. As confocal detection involves optical sectioning, the background image changes with the axial position of the sample. Thus, it is beneficial to acquire a library of background images at different axial positions of the coverglass. Following this, the coverglass is substituted with the sample of interest, and its iSCAT confocal image is captured. To remove the background from the raw image, the intensity of the raw image is pixelwise divided by the intensity of the corresponding background image. The visibility of small cell structures can be further enhanced by image flattening as shown in FIG. 4*g*.

Figure 4H:
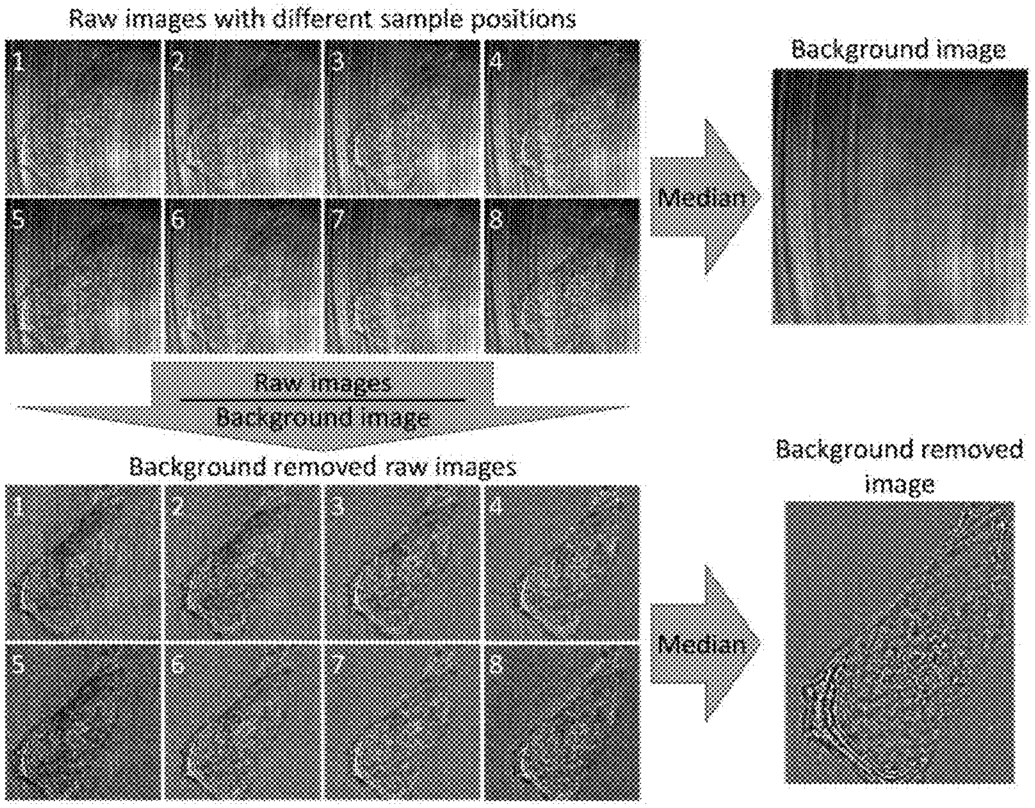

In FIG. 4*h*, for a static sample, as the signal and background are both stationary, the sample is deliberately moved laterally during which the signal is varied spatially and temporally and the background remains stationary. Specifically, eight raw images are acquired as the sample position is laterally displaced at (0 μm, 0 μm), (3 μm, 0 μm), (6 μm, 0 μm), (9 μm, 0 μm), (0 μm, 3 μm), (3 μm, 3 μm), (6 μm, 3

μm), (9 μm, 3 μm). Larger displacements produce noticeable changes in the background. The background image is then estimated by calculating pixel-by-pixel the median image of the eight images. The median background image is removed from the raw image by division. Then, the eight background removed images are spatially registered and averaged, producing the final background removed image.

Figure 4I:
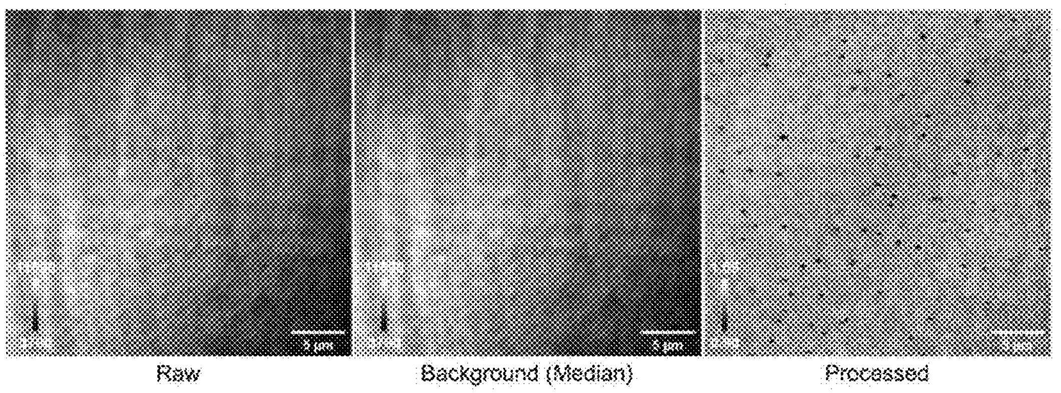

In FIG. 4*i*, for a sample of moving targets of interest, background estimation can be conveniently done by recording a raw video and calculating a temporal median image of the video. This temporal median background is then removed from the individual raw image by division pixel-by-pixel. FIG. 4*i* displays an example of a raw image of nanoparticles diffusing on a model membrane (left) with its corresponding background image (middle), and its background removed image (right).

Experiment:

The confocal-based iSCAT microscopy system as shown in FIG. 2*b* is developed by utilizing a commercial spinning disk scanner unit. A laser diode module with a 561 nm wavelength (OBIS 561, Coherent) was used as the light source. A Yokogawa confocal scanner unit (CSU-X1) was installed on an inverted microscope (Eclipse Ti2, Nikon). To convert the original fluorescence detection into scattering detection, polarization optics techniques were utilized. Specifically, a plate polarization beam splitter (PBS) (Control Optics Taiwan Inc.) is prepared. The PBS is made via sputter coating on a fused silica substrate, with an extinction ratio of Tp:Ts>1000:1 and Rs:Rp>40:1 at an incidence angle of 45° at the wavelength of 561 nm. In addition, a quarter-wave plate (QWP) (WPQ10M-561. Thorlabs) is added to the filter cube of the turret. The combination of the PBS and the QWP considerably enhanced the collection efficiency of the iSCAT signal of the sample. Moreover, a linear polarizer (LPVISC100, Thorlabs) is installed in front of the camera to eliminate the nonspecific reflection background of the apparatus (mainly contributed by the reflection of the pinhole disk). A very weak reflective background of the pinhole disk remains, which is thought to be created by the depolarization effects of the backscattering of the pinholes. A high numerical aperture (NA), oil-immersion microscope objective (CFI Plan Apochromat Lambda 100× Oil, Nikon) was used. As the detector, a scientific CMOS camera (Zyla, Andor) allowed us to record high-speed iSCAT videos. The iSCAT confocal microscope system can be converted from iSCAT to fluorescence imaging simply by replacing the PBS and linear polarizer with a dichroic beam splitter and a fluorescence emission filter, respectively.

The spinning disk is operated at its maximal rotation speed of 10,000 rpm. The Yokogawa scanner unit utilizes a Nipkow disk that scans the specimen once for every 30° of rotation. Thus, the duration of a single sample scan is 0.5 ms, and one disk rotation yields 12 sample scans. To stabilize the illumination intensity, the camera was set to global shutter mode with a frame time and an exposure time of multiples of 0.5 ms. For example, a frame time of 1 ms (1,000 fps) is set with an exposure time of 0.5 ms, a frame time of 2 ms (500 fps) is set with an exposure time of 1.5 ms, and a frame time of 6 ms (166.67 fps) is set with an exposure time of 5.5 ms. Using the aforementioned settings, spatially moving fringes in a video caused by the frequency mismatch between the disk rotation and the image acquisition is avoided. A periodic variation of 10% peak-to-peak in the measured intensity every 1 ms is still observed. It can be interpreted that this periodic variation is the result of the imperfect manufacture of the spinning disk, yielding distinct but repeatable illumination patterns every 30° of rotation. To minimize the intensity variation between individual scans, each image of a video with its averaged spatial intensity is normalized. After normalization, the intensity fluctuation was about 1%.

The imaging sensitivity of our iSCAT confocal microscope is characterized with gold nanoparticles (AuNPs). Single 30-nm diameter AuNPs (BBI Solutions) are immobilized on a clean coverglass via spin coating and submerged in water for imaging. When the sample particle is positioned at the focal plane of the microscope objective, the backscattered light of the particle and the reflection of the water-glass interface were collected and projected onto the camera. The measured intensity can be written as below Eq. (1).

$$I_{det} = |Er|^2 + |Es|^2 + 2|Er||Es|\cos\theta \tag{1}$$

Er is the reflected reference field, Es is the backscattered signal field, and θ is the phase difference between the two fields. For weakly scattering objects, the $|Es|^2$ is negligible compared to the other two terms in Eq. (1). The iSCAT contrast is defined as the interferometric visibility of the signal.

$$iSCAT \text{ contrast} = \frac{2|Er||Es|\cos\theta}{|Er|^2} = 2\frac{|Es|}{|Er|}\cos\theta \tag{2}$$

Note that the interference contrast is determined by the ratio of the backscattered signal field to the reference field and the phase difference between the two fields. While both optical fields are spatially filtered by the confocal pinhole, these two fields still have different spatial modes (because the pinhole is not infinitely small) and thus they undergo different phase evolutions along the z direction (i.e., θ is a function of z).

Figure 5A:
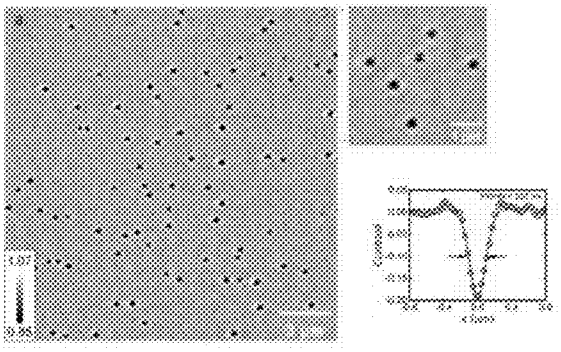
FIGS. 5*a*-5*f* show iSCAT confocal imaging and tracking of single 30 nm AuNPs.
Figure 5B:
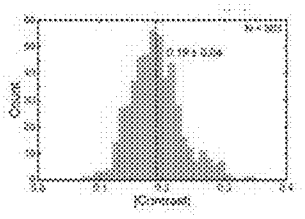

FIGS. 5*a*-5*f* show iSCAT confocal imaging and tracking of single 30 nm AuNPs. In FIG. 5*a*, single 30 nm AuNPs are immobilized on a coverglass. The inset is a closeup view of the iSCAT image of a 30 nm AuNP and its contrast line profile with a Gaussian fitting (red curve). FIG. 5(*a*) displays the iSCAT confocal contrast image of 30 nm AuNPs exhibiting destructive interference between the signal and the reference (cos θ≈−1; the particle appears as a dark spot in the image). FIG. 5*b* is the histogram of iSCAT contrast of single 30 nm AuNPs. The normalized iSCAT contrast of 30 nm AuNP is about 0.19 (FIG. 5*b*), which is comparable to the contrast obtained using wide-field iSCAT microscopy. The high contrast of AuNP indicates that the polarization optics successfully eliminates the nonspecific background reflection of the scanning unit. Conversely, when these polarization optics were removed and replaced with a non-polarizing beam-splitter, the nonspecific background considerably reduced the sensitivity (FIG. S1, Supplement 1).

The accurate measurement of the reference intensity $|Er|^2$ is essential for detecting the weakly scattering objects with a low iSCAT contrast. The reference intensity (also referred to as "background intensity") is generally spatially heterogeneous owing to the nonuniform illumination and inevitable reflection from the optical elements. When the target of interest is in motion, the background intensity is estimated by calculating the temporal median image of an iSCAT video. The spinning disk confocal microscope produces nonidentical but reproducible illumination backgrounds between individual scans (about 1% intensity variation). To further reduce the background fluctuation, the multiple temporal median background images for correction are calculated when the frame time is shorter than the time required for the spinning disk to make one revolution (i.e., 6 ms). For example, three background images were calculated for a frame time of 2 ms, while six background images were calculated for a frame time of 1 ms. For a static sample, we modulated the sample position laterally and extracted the static background intensity from the moving signal. The detailed procedures for background correction and its performance can be referred to FIGS. 4*g*-4*i* with their discussion.

Figure 5C:
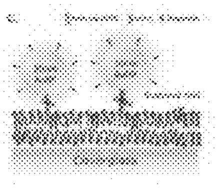
Figure 5D:
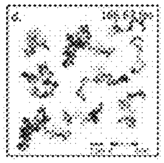
Figure 5E:
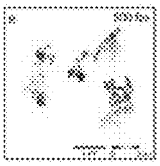
Figure 5F:
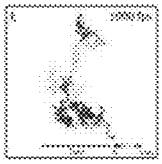

The iSCAT confocal microscope system with the spinning disk has ability to acquire high-speed videos with optical sectioning. Herein, high-speed imaging of single nanoparticles diffusing on a supported lipid bilayer membrane is demonstrated. This model membrane system has been used as a platform to study single-molecule membrane dynamics. An artificial lipid bilayer membrane was prepared on the coverglass. Biotinylated phospholipids (1 mol %) were incorporated into the membrane for AuNP labeling through streptavidin (see FIG. 5*c*). FIG. 5*c* is a schematic diagram of AuNPs attaching to lipid molecules in the supported lipid bilayer membrane on a coverglass. After attachment, the AuNPs diffused laterally on the membrane whose motion was recorded using the iSCAT confocal microscope system at 166.67 fps. The diffusion trajectory was reconstructed by locating the AuNP in each image with a home-written MATLAB code followed by connecting the consecutive localizations (FIG. 5*d*). The SNR of 30 nm AuNP is about 18, yielding a localization precision of about 6.5 nm. It is possible to acquire images at a faster rate with a narrower FOV. The SNR decreased slightly as the imaging speed was increased (SNR of about 11 for 500 fps and about 9 for 1,000 fps, respectively). The decrease in SNR is attributed to the twofold increase in the noise floor caused by the lower photon flux. The diffusion trajectories recorded at 500 and 1,000 fps are depicted in FIG. 5*e* and FIG. 5*f*, respectively. The faster image acquisition rate enables to resolve detailed diffusive movement at the nanoscale.

Figure 6:
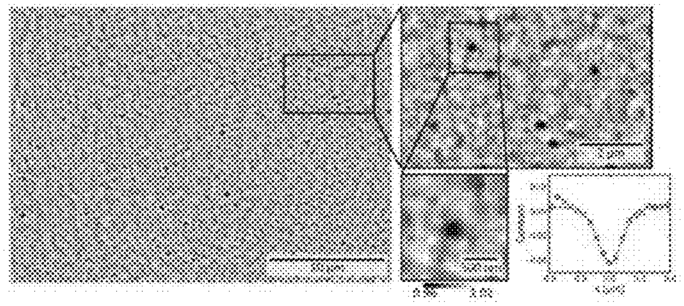
FIG. 6 shows iSCAT confocal image of single 10 nm AuNPs.

As shown in Eq. (2), the iSCAT contrast of a particle is determined by the ratio of the signal and reference fields. Therefore, to detect very small nanoparticles, the iSCAT contrast of the particle can be enhanced by decreasing the intensity of the reference beam. This can be accomplished by replacing the sample immersion water with a high refractive index liquid, which decreases the reflectivity at the sample-coverglass interface and thus reduces the reference beam intensity. The water with glycerol (G2025, Sigma-Aldrich) is replaced with a refractive index of 1.474. It reduced the reflectivity by a factor of 21.5 (from 0.43% to 0.02%, assuming the refractive indices of water and coverglass are 1.33 and 1.517, respectively). Meanwhile, exchanging the medium from water to glycerol also modified the scattering cross section of AuNP slightly (increased by about 33%; the change is small because gold has a large complex refractive index). Taken together, the medium exchange yields a $\sqrt{1.33\times21.5}\cong5.3$ fold increase in iSCAT contrast. With contrast enhancement, single 10 nm AuNPs immobilized on the coverglass (FIG. 6) can be detected. The enhanced iSCAT contrast of 10 nm AuNP is about 0.04, yielding a SNR about 4. FIG. 6 shows iSCAT confocal image of single 10 nm AuNPs. The inset plots the iSCAT contrast line profile together with a Gaussian fitting (red curve). A spatial Gaussian filter with a standard deviation of 0.7 pixels is applied.

Finally, it is verified that the measurement of the iSCAT confocal imaging is shot-noise-limited and thus the detection sensitivity can be improved by increasing the number of detected photons through averaging. The iSCAT images of a clean coverglass can be acquired at the maximal frame rate of 1,000 fps and the fluctuation of its iSCAT contrast can be analyzed. The noise is defined as the standard deviation of the contrast fluctuation. The dependency of the noise on the number of detected photons N follows the power law of $1/\sqrt{N}$, indicating that the major noise is the iSCAT imaging is the photon shot noise at the highest image acquisition rate.

The 3D imaging capabilities of iSCAT confocal microscopy system can be examined by using biological cells. Human bone osteosarcoma epithelial (U2OS) cells were cultured on a coverglass-bottom dish (WillCo Wells). The optical sectioning capability of the iSCAT confocal is examined by acquiring a z stack of images of a cell. As the water-coverglass interface moves out of focus, the intensity of the reference beam decreases owing to the confocal sectioning. However, within an axial distance of about 1 μm, the intensity of the reference beam is still sufficient for iSCAT imaging. The strongly attenuated reference beam makes it challenging to acquire iSCAT images deeper within the sample.

Figure 7A:
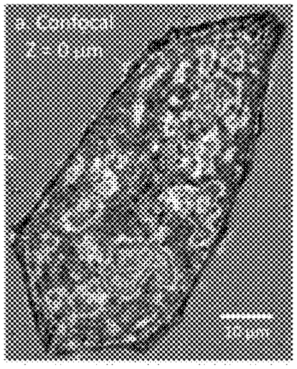
FIGS. 7*a*-7*d* show the comparison between the confocal and wide-field iSCAT images of a biological cell.
Figure 7B:
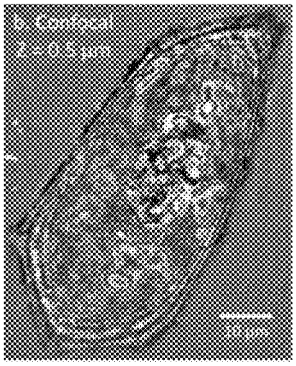
Figure 7C:
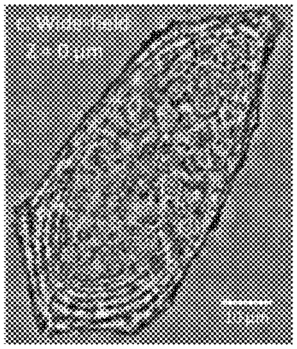
Figure 7D:
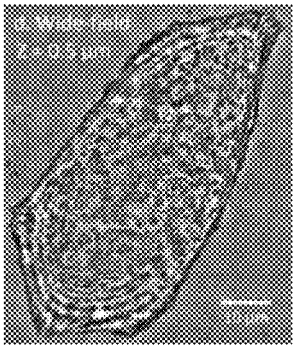

FIGS. 7*a*-7*d* show the comparison between the confocal and wide-field iSCAT images of a biological cell. FIGS. 7*a* and 7*b* show the iSCAT confocal image of a U2OS cell at z=0 μm (FIG. 7*a*) and z=0.5 μm (FIG. 7*b*). FIGS. 7*c* and 7*d* show he iSCAT wide-field images of the same cell shown in FIG. 7*a* and FIG. 7*b* acquired at the corresponding axial positions, i.e., z=0 μm (FIG. 7*c*) and z=0.5 μm (FIG. 7*d*). While the two confocal images in FIG. 7*a* and in FIG. 7*b* display distinct features because of the optical sectioning, the two wide-field images in FIG. 7*c* and in FIG. 7*d* show similar features as the result of a lower axial resolution. It is noted that FIG. 7*c* and FIG. 7*d* are tiled images of 4×4 original images because the wide-field iSCAT microscope has a smaller FOV.

FIG. 7*a* displays the iSCAT confocal image of a cell with the focal plane positioned at the basal membrane of the cell (i.e., at the cell-coverglass interface). At this z position, distinct iSCAT contrast variation is observed due to the morphology of the basal membrane, reminiscent of the adhesion factors previously observed by the wide-field iSCAT microscopy. When the focal plane was moved into the cell by 0.5 μm, distinct features became visible, and the cell nucleus enclosed by the nuclear membrane (FIG. 7*b*) can be seen. The great differences in the two iSCAT confocal images at the two axial positions illustrate the excellent optical sectioning capability of the microscope by eliminating the out-of-focus scattering signal.

To illustrate the effect of optical sectioning on 3D cell imaging, a standard wide-field iSCAT microscope is used to acquire a z stack iSCAT images of the same cell as a comparison. The wide-field iSCAT images at the two corresponding heights (z=0 μm and z=0.5 μm) are displayed in FIG. 7*c* and FIG. 7*d*, respectively. Unlike the two iSCAT confocal images, the two wide-field iSCAT images show very similar features because the wide-field iSCAT microscope has a lower axial resolution. It is noted that, in the wide-field iSCAT images, the concentric interference fringes appear on the cell periphery over a long axial range due to the reflection of the plasma membrane. Such interference rings are largely eliminated by the optical sectioning of the iSCAT confocal microscope system.

Figure 8A:
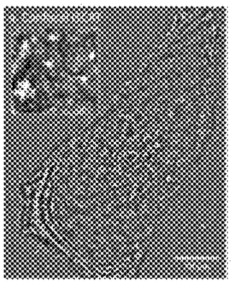
FIGS. 8*a*-8*c* show iSCAT and fluorescence confocal images of a U2OS cell.
Figure 8B:
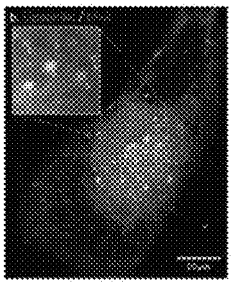
Figure 8C:
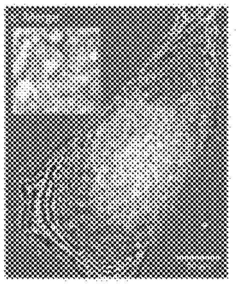

The iSCAT confocal microscope system is compatible with the confocal fluorescence imaging. As a demonstration, the DNA in the cell nucleus is labeled with the fluorescent dye DRAQ5 (ab108410, Abcam) and stained the cell membrane with a lipophilic dye (D3898, FAST DiO, Invitrogen). The iSCAT confocal image of a cell and the corresponding fluorescence images of the two dyes are shown in FIGS. 8*a*-8*c*. FIGS. 8*a*-8*c* show iSCAT and fluorescence confocal images of a U2OS cell. FIG. 8*a* shows iSCAT confocal image of the cell. FIG. 8*b* shows two-color fluorescence image of the cell. Fluorescence signals of the lipophilic dye and the DNA dye are displayed in green and red, respectively. FIG. 8*c* shows overlay of the iSCAT image of FIG. 8*a* and the fluorescence image of FIG. 8*b*. The insets display the close-up views of the cell vesicles. The magenta arrows indicate the vesicles that appear both in the iSCAT and fluorescence channels, whereas the blue arrows indicate the particles that are clearly detected in iSCAT but show low fluorescence intensity. Both the plasma membrane and the nuclear membrane produce strong iSCAT signals. Furthermore, it is observed that many small particles in the iSCAT channel were colocalized with the DNA and lipophilic dyes (Insets of FIG. 8*a*-8*c*), indicating that they are involved in the uptake of the DNA dye and lipid-rich vesicles.

Figure 9A:
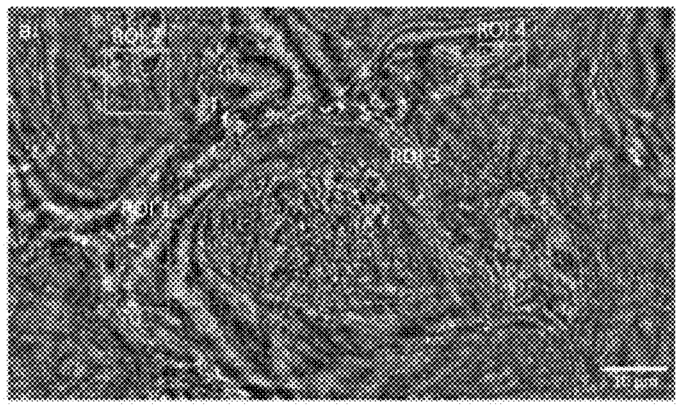
FIG. 9*a*-9*e* show diffusive motion of biological nanoparticles observed using high-speed iSCAT confocal microscopy.
Figure 9B:
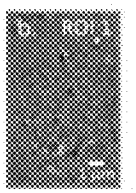
Figure 9C:
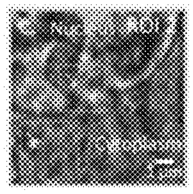
Figure 9D:
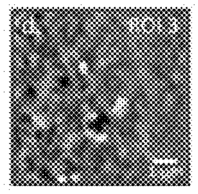
Figure 9E:
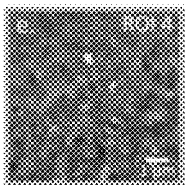

Through the iSCAT channel, it is observed that many nanoparticles are in constant motion within living cells. Using single-particle tracking and the fast image acquisition of the iSCAT confocal microscopy system, the diffusive motion of these fast-moving vesicles can be measured. FIG. 9*a*-9*e* show diffusive motion of biological nanoparticles observed using high-speed iSCAT confocal microscopy. FIG. 9*a* shows a snapshot of iSCAT confocal video of multiple cells. The regions of nuclei are marked in red, corresponding to the fluorescence image of the DNA staining. FIGS. 9*b*-9*e* show closeup view of the four ROIs indicated in FIG. 9*a*. The diffusion trajectories of the vesicles are plotted in red. Particles undergoing directional diffusion are indicated by magenta arrows. In FIG. 9*b*, ROI1 marks a region at the cell periphery where the particles move along the cell boundary. In FIG. 9*c*, ROI2 shows a region at the border of a nucleus where the directional motion of a particle is observed. In FIG. 9*d*, in ROI3, the association of a particle to a large cell structure (indicated by the yellow arrow) is monitored. In FIG. 9*e*, ROI4 displays the random diffusion of particles in the cytoplasm. FIG. 9*a* plots a snapshot of the iSCAT image of multiple cells. Four regions of interest (ROIs) are indicated by the rectangular boxes whose closeup views are shown in FIGS. 9*b*-9*e*. Within these ROIs, nano-sized biological particles are detected and their diffusive motions are measured. To improve the localization accuracy, the static cellular background is measured by using temporal median filtering and then the background is removed from the raw image by division. The trajectories of the biological nanoparticles are shown in FIG. 9*b*-9*e*. The majority of the particles diffuses within local confinements with a maximum displacement of less than 450 nm per second. These particles are confined within cytoskeleton meshworks. Occasionally, it is observed that some particles translocate over a longer distance of more than about 1.5 μm through directional motion, which is interpreted as the result of the active transport of the cell. The continuous single-particle tracking is often interrupted when the particle diffuses out of the focal plane. Indeed, the iSCAT confocal microscope system has a rather thin detection volume due to its optical sectioning capability. While the particle tracking is demonstrated in 2D, the 3D particle tracking should be possible with proper modeling of the point-spread function and calibration.

In some embodiments, the iSCAT confocal microscope system can be a high-speed spinning disk iSCAT confocal microscope for wide-field iSCAT imaging with optical sectioning. The operational conditions includes polarization optics and the synchronization of the disk rotation and image acquisition. The iSCAT confocal microscope enabled the visualization of single nanoparticles as small as 10 nm AuNPs. In addition, the high-speed tracking of the nanoscopic motion of a single AuNP (up to 1,000 fps) is demonstrated. Moreover, the iSCAT confocal imaging of living cells is demonstrated. The plasma membrane and nuclear membrane are clearly visualized and resolved with optical sectioning. Furthermore, numerous nano-sized cell vesicles diffusing in the cytoplasm in 3D are observed. In conjunction with multicolor fluorescence confocal imaging, the iSCAT confocal imaging provides rich structural and dynamic information about the cell sample. Thus, the iSCAT confocal microscopy system is suitable for confocal microscopy when examining cell samples.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever.

All references cited herein are incorporated herein by reference in their entirety and for all purposes to the same extent as if each individual reference (e.g., publication or patent or patent application) was specifically and individually indicated to be incorporated by reference in its entirety for all purposes. Other embodiments are within the following claims.

The invention claimed is:

1. A scanning device for iSCAT confocal microscope observation, comprising:

a lens for receiving an incident light;

a spinning disk, having pinholes;

a polarization beam splitter, between the lens and the spinning disk; and a quarter-wave plate module, comprising at least one quarter-wave plate, wherein the lens, the polarization beam splitter and the spinning disk are configured to cause the incident light to be through the lens, the polarization beam splitter and the spinning disk for sample illumination, wherein the spinning disk and the polarization beam splitter are configured to cause a return iSCAT signal to be through the spinning disk to the polarization beam splitter, wherein the pinholes are configured to spatially filter the return iSCAT signal for confocal-based detection, wherein the polarization beam splitter is configured to direct the return iSCAT signal to a light path for image observation, and wherein the incident light is linearly polarized light before reaching the polarization beam splitter, the quarter-wave plate module is configured to transform the incident light from linearly polarized light into circularly polarized light and to transform the return iSCAT signal from circularly polarized light into linearly polarized light, and the polarization beam splitter has a high transmission for the linear polarization of the incident light and a high reflection for the linear polarization of return iSCAT signal.

2. The scanning device of claim 1, wherein
the polarization beam splitter is configured to reflect the return iSCAT signal to the light path for the image observation, and
the return iSCAT signal is adapted to form an iSCAT confocal image on an image capturing device.

3. The scanning device of claim 1, wherein the quarter-wave plate is inserted in a filter cube turret of a microscope.

4. The scanning device of claim 1, wherein the scanning device further comprises a linear polarizer in the light path for the image observation.

5. The scanning device of claim 1, wherein
the incident light is laser light,
the spinning disk is a Nipkow disk and rotatable, and
the pinholes are configured to be illuminated by the incident light to optically project to a sample through a microscope.

6. An iSCAT confocal microscope system, comprising:
a microscope; and
a scanning device, comprising:
a lens for receiving an incident light;
a spinning disk, having pinholes;
a polarization beam splitter, between the lens and the spinning disk; and
a quarter-wave plate module, comprising at least one quarter-wave plate,
wherein the lens, the polarization beam splitter, the spinning disk and the microscope are configured to cause the incident light to be through the lens, the polarization beam splitter, the spinning disk and the microscope,
wherein the microscope, the spinning disk and the polarization beam splitter are configured to cause a return iSCAT signal to be through the microscope and the spinning disk to the polarization beam splitter,
wherein the pinholes are configured to spatially filter the return iSCAT signal for confocal-based detection,
wherein the polarization beam splitter is configured to direct the return iSCAT signal to a light path for image observation, and
wherein the incident light is linearly polarized light before reaching the polarization beam splitter, the quarter-wave plate module is configured to transform the incident light from linearly polarized light into circularly polarized light and to transform the return iSCAT signal from circularly polarized light into linearly polarized light, and the polarization beam splitter has a high transmission for the linear polarization of the incident light and a high reflection for the linear polarization of return iSCAT signal.

7. The system of claim 6, wherein
the polarization beam splitter is configured to reflect the return iSCAT signal to the light path for the image observation, and
the return iSCAT signal is adapted to form an iSCAT confocal image on an image capturing device.

8. The system of claim 6, wherein the quarter-wave plate is in a filter cube turret of the microscope.

9. The system of claim 6, wherein the scanning device further comprises a linear polarizer in the light path for image observation.

10. The system of claim 6, wherein
the incident light is laser light,
the spinning disk is a Nipkow disk and rotatable, and
the pinholes are configured to be illuminated by the incident light to optically project to a sample through the microscope.

11. The system of claim 6, wherein the microscope is an inverted optical microscope or a transmission confocal microscopy.

12. A method for iSCAT confocal microscope observation, comprising:
receiving a laser incident light by a lens, wherein the laser incident light is linearly polarized light;
illuminating pinholes of a spinning disk by the laser incident light to optically project to a sample through an optical microscope;
transforming the laser incident light from linearly polarized light into circularly polarized light before the laser incident light reaches the sample by using a quarter-wave plate module for iSCAT image observation, wherein the quarter-wave plate module comprises at least one quarter-wave plate;
transforming a return iSCAT signal from circularly polarized light into linearly polarized light by using the quarter-wave plate module for iSCAT image observation;
spatially filtering the return iSCAT signal for confocal-based detection by the pinholes; and
directing the return iSCAT signal to a light path for iSCAT image observation.

13. The method of claim 12, wherein the spinning disk is a Nipkow disk and rotatable, the return iSCAT signal is linearly polarized in the light path for the image observation, and the return iSCAT signal is adapted to form an iSCAT confocal image.

14. The method of claim 13, further comprising:
removing background in the iSCAT confocal image based on the spatial heterogeneity of the background.

15. The method of claim 12, wherein the microscope is an inverted optical microscope or a transmission confocal microscopy.

16. The method of claim 12, wherein the return iSCAT signal is directed to the light path for the image observation by a polarization beam splitter.

17. The method of claim 12, wherein the laser incident light is p-polarized light.

18. The method of claim 12, wherein the laser incident light and the return iSCAT signal have different linear polarizations.

19. An iSCAT confocal microscope system, comprising:
a microscope;
a scanning device, comprising:
a lens for receiving an incident light;
a spinning disk, having pinholes; and
a polarization beam splitter, between the lens and the spinning disk; and
a quarter-wave plate module for iSCAT image observation, comprising at least one quarter-wave plate;
wherein the lens, the polarization beam splitter, the spinning disk and the microscope are configured to cause the incident light to be through the lens, the polarization beam splitter, the spinning disk and the microscope,
wherein the microscope, the spinning disk and the polarization beam splitter are configured to cause a return iSCAT signal to be through the microscope and the spinning disk to the polarization beam splitter, the quarter-wave plate module for iSCAT image observation is configured to transform at least one of the incident light and the return iSCAT signal,
wherein the pinholes are configured to spatially filter the return iSCAT signal for confocal-based detection, and wherein the polarization beam splitter is configured to direct the return iSCAT signal to a light path for iSCAT image observation.

20. The system of claim 19, wherein the at least one quarter-wave plate is inserted in a filter cube turret of the microscope.

* * * * *